3,121,221
AUTOMATIC FREQUENCY CONTROL
James L. Sullivan and Frank P. Papasso, Princeton, N.J., assignors, by mesne assignments, to the United States of America as represented by the Secretary of the Navy
Filed Mar. 3, 1959, Ser. No. 796,990
5 Claims. (Cl. 343—5)

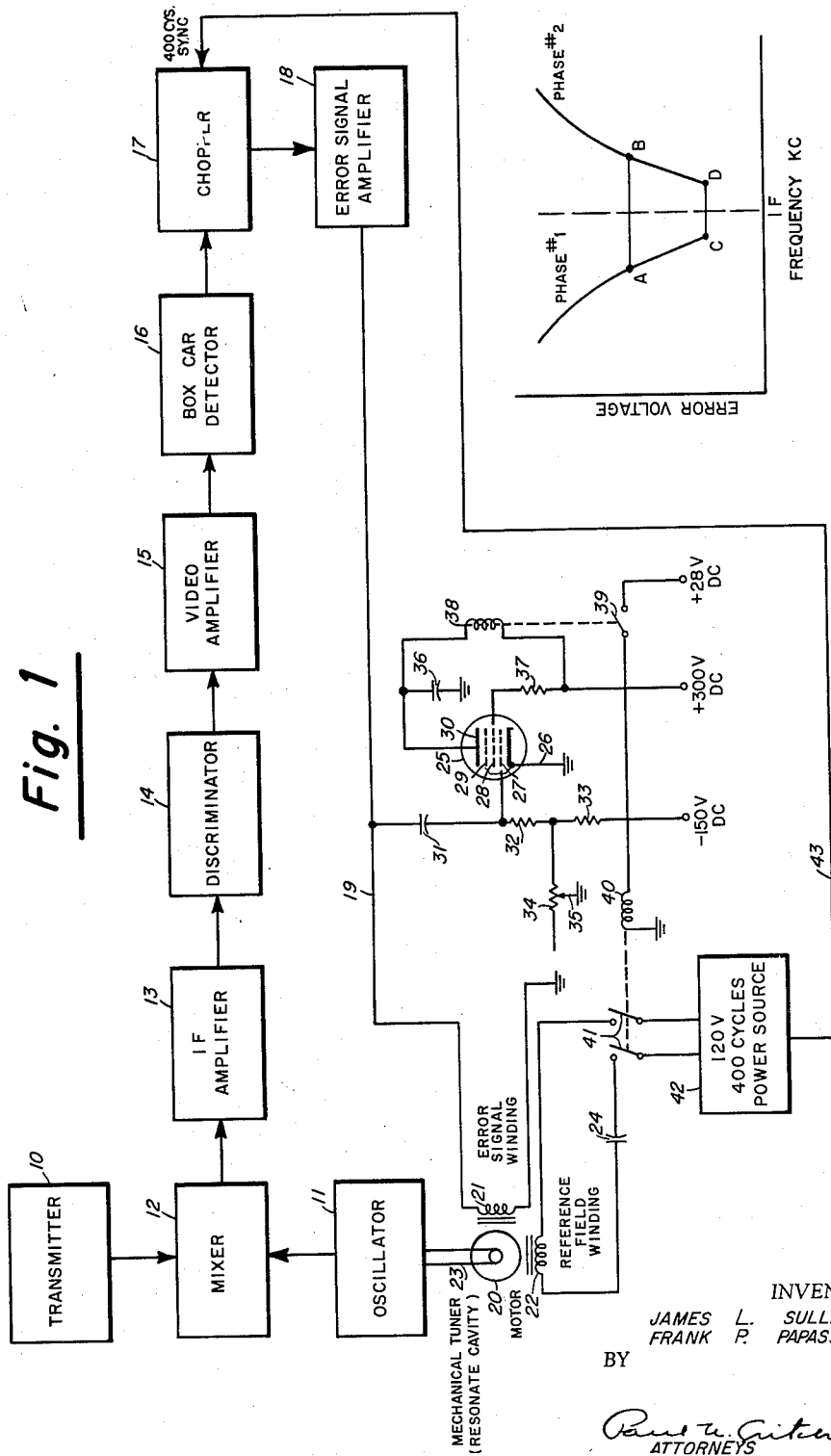
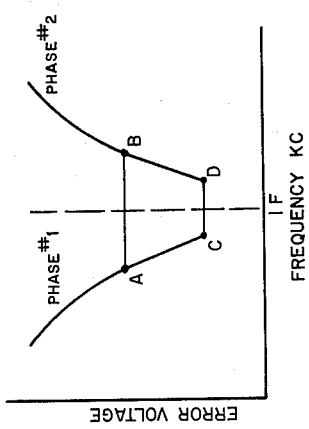
Fig. 1
Fig. 2
INVENTORS
JAMES L. SULLIVAN
FRANK P. PAPASSO
BY
ATTORNEYS

This invention generally relates to automatic frequency control systems for radio-frequency oscillations of the resonant cavity velocity modulated or reflux klystron type and in particular concerns improved remote control means for reducing error frequency differences between a given design standard and a transmitted modulated signal within a predetermined frequency range in a radar system.

Up to the present time, the prior art envolving automatic frequency control has been found to produce unwanted random frequency disturbances at the frequency which is being controlled due to the continuous operation of associated electrical controlling apparatus about the control point. In the radar art, this is particularly disadvantageous because such disturbances reduce the sensitivity and accuracy of the radar device and may prevent it from distinguishing between a fixed and a moving target.

The present invention substantially prevents the existence of such unwanted random disturbance signals at the control frequency point by entirely eliminating control operations within a predetermined range on either side of said point. This is accomplished by automatically and timely deactivating and activating the controlling apparatus as necessary to provide optimum performance under any given set of operating conditions.

It is, therefore, an object of this invention to provide an automatic frequency control system for a radar device which will substantially eliminate undesirable random frequency and noise signals at the standard frequency or control point.

Another object of this invention is to provide a frequency control system which will automatically and selectively activate and deactivate itself appropriately within a predetermined frequency range and at desired frequency points.

Still another object of this invention is to stabilize the intermediate frequency (I.F.) of a radar device in such manner that random operational distortion frequencies broadcast by the controlling apparatus will be substantially eliminated at the control point.

A further object of this invention is to provide an intermediate frequency control system for a radar device which will facilitate differentiation between fixed and moving targets by minimizing stray signal disturbances.

A final but important object of this invention is to provide an intermediate frequency control system for a radar device which is simple and easily adjusted.

The exact nature of this invention as well as other objects and advantages thereof will be readily apparent from consideration of the following specification relating to the annexed drawing in which:

FIG. 1 is a schematic circuit diaphragm, partly in simplified block form, illustrating the preferred embodiment of the invention; and FIG. 2 depicts a curve of error voltage vs. frequency which is explanatory of the frequency control system of the embodiment of FIG. 1.

It is to be understood that the invention is not limited in its application to the details of construction and arrangement of parts illustrated in the aforementioned accompanying drawings, since the invention is capable of other embodiments and of being practiced or carried out in various ways. Also, it is to be understood that the phraseology or terminology employed herein is for the purpose of description and not limitation.

Referring now to the drawings in which the same or corresponding parts are identified by the same number, there is shown in FIG. 1 a radar intermediate frequency stabilizing system comprising an electromagnetic energy transmitter 10 whose frequency is determined by a conventional magnetron. Stable local oscillator 11 is of the turnable type, the frequency output of which is beat with the transmitter frequency in a mixer 12 to produce an intermediate frequency signal. This intermediate frequency signal is fed through an I.F. amplifier 13 to a discriminator 14 which provides an output representative of the difference between the standard intermediate frequency signal desired and the actual intermediate frequency existing at any given instant, said output being herein defined as an error signal. This error signal is fed consecutively to a video amplifier 15, a box car detector 16, a chopper 17 and an amplifier 18 to provide it with the proper amplitude and phase relationship necessary to appropriately apply it through electrical lead 19 to the coating frequency control system mentioned below. Each of the foregoing components, of course, may be of conventional types which cooperate in a conventional manner to produce the resulting error signal at electrical lead 19.

Oscillator 11 is tuned by a mechanical tuner 23 adjusted as necessary to vary the oscillatory output signal thereof. In the presently illustrated embodiment of FIG. 1, mechanical tuner 23 is of the resonant cavity type and is connected to a motor 20 in such manner that when the motor shaft turns in one direction the oscillatory output frequency of the oscillator is decreased while turning in the opposite direction the oscillatory output frequency of the oscillator increases by proportionally changing the size of the tuner resonant cavity. Motor 20 is of the A.C. type and contains an error signal winding 21 through which current flows at any given instant as determined and regulated by the phase relationship between the error signal and a reference frequency. Motor 20 also contains a reference field winding 22 which is timely excited by a 400 cycle, 120 volt power source 42 through relay switch contacts 41 and a phase-shifting condenser 24.

Tube 25 is an amplifier of the type which may be biased for class C operation and contains a cathode 26, a control grid 27, a screen grid 28, a suppressor grid 29, and a plate 30. In this embodiment, it is desirable to electrically connect cathode 26 to suppressor grid 29. To enable the error signal to be amplified to a useful value, control grid 27 is connected through a coupling condenser 31 to error signal lead 19. Also, interposed between grid 27 and a negative voltage source of the order of −150 volts D.C. is a pair of series connected resistors 32 and 33. At the point of juncture of resistors 32 and 33, a bias adjustment potentiometer 34 containing a wiper 35 is connected, with wiper 35, in turn, being connected to ground.

Cathode 26 of tube 25 is connected to ground and plate 30 is connected to one terminal of a relay solenoid 38. In addition, plate 30 of tube 25 is connected to ground through a condenser 36. The other terminal of relay solenoid 38 is connected to a high D.C. voltage source of the order of +300 volts. Screen grid 28 is charged positive by said high D.C. voltage source through a resistance 37. Energization of relay solenoid 38 closes relay switch contacts 39 which places a D.C. voltage of the order of 28 volts on a relay solenoid 40 with respect to ground. Energization of relay solenoid 40 actuates relay switch contacts 41 to close same and, hence, excites reference field winding 22 of motor 20 with 120 volts A.C. oscillating at 400 cycles per second from a reference frequency power source 42. Chopper 17 is synchronized with the frequency of the 400 cycle power source 42 through a connector 43 for the purpose of providing the appropriate phase relationship between the error signal applied to error signal winding 21 and the reference signal applied to reference field winding 22 in order that motor 20 will turn in the proper direction to tune resonate cavity mechanical tuner 23.

The general operation of the embodiment of this invention as disclosed in FIG. 1 is such that, when the magnetron frequency of the transmitter drifts, the intermediate frequency (I.F.) varies proportionally, since the transmitter frequency is beat with the stable oscillator frequency in the mixer to produce the intermediate frequency output at the mixer. This signal is amplified and then fed to the discriminator where the amount of drift of the intermediate frequency is determined and converted into an output signal whose amplitude is proportional to said drift. This signal is then amplified by the video amplifier, demodulated by the box car detector, and chopped by the chopper at which time it becomes an error signal whose time phase is either leading or lagging the phase of the 400 cycle reference frequency, depending upon whether the intermediate frequency is greater or less than the design standard intermediate frequency of the radar device due to proportional transmitter frequency drift. Of course, in event that no drift occurs, no useful error signal is emitted from the chopper. After being amplified, the error signal is applied to the error signal winding of the oscillator tuning motor where its phase relationship with the 400 cycle A.C. passing through the reference field winding of the oscillator tuning motor directionally actuates the motor armature which, in turn, proportionally adjusts the length of the resonant cavity if the reference field winding of oscillator tuning motor is simultaneously energized therewith. However, it is noteworthy that the operation of the oscillator is contingent upon the reference field winding being energized and such energization depends on relay contacts 41 being closed. Closing of relay contacts 41 is indirectly contingent on the amplitude of the error signal voltage being sufficiently large to overcome the cutoff bias voltage of tube 25. When such is the case, said error signal voltage is applied through coupling condenser 31 to the grid of power amplifier tube 25 which fires applying plate current to and energizing relay solenoid 38 which, in turn, closes relay switch contacts 39 to place 28 volts D.C. across relay solenoid 40. From this arrangement it can be seen that the servo operation obtained from the use of two interacting relay systems enables control of the oscillator tuner to be effected from a distance and that such remote control facilitates proper arrangement of the aforementioned power sources and their cooperating elements to produce optimum operation at minimum expense.

The bias system of tube 25 is effected by placing the desired cutoff voltage on the control grid from a negative 150 volt D.C. source through a voltage divider system consisting of resistors 32 and 33. In addition, the bias voltage may be regulated manually by means of potentiometer 34 connected between the interconnection of resistors 32 and 33 and ground for purposes to be hereinafter described.

As previously mentioned, it is definitely desirable to have a minimum of transient noise or disturbance signals transmitted by the controlling apparatus, particularly within the immediate range of the design intermediate frequency of the radar device, in order that the moving target indication radar may distinguish between fixed and moving targets. Such operating conditions are produced in a new manner by this invention and achieves the desired results by the unique but simple expedient of effectively disconnecting the control apparatus during an operating condition where radar intermediate frequency has not drifted beyond a given permissible frequency range above or below the design frequency, herein defined as a null frequency band. In other words, the subject device produces a null frequency range about the control intermediate frequency point during which the control apparatus is for all practical purposes disconnected and, hence, cannot transmit disturbance signals, since substantially no electrical activity of a transmittable nature exists in the control system at that time. However, at predetermined control points above and below the design intermediate frequency, the control apparatus becomes activated to prevent further I.F. drift and direct it back to the operationally permissible null range, but very small drifts in magnetron frequency, the controlling of which would create a great deal of electrical disturbances that would be intolerable, have been reduced to a negligible minimum. Since very small drifts in the transmitter frequency will not adversely affect operation of the radar device as much as the presence of disturbance signals in the intermediate frequency range area, the device of this invention fulfills its objectives and, thus, constitutes a novel improvement over the prior art.

The disconnection of the controlling apparatus when the I.F. is operating within the null frequency band is effectively accomplished by electrically removing the reference field winding 22 from motor 20 so that the mechanical resonant cavity size is not changed at that time. Although the amplified but small error signals received from chopper 17 are continuously applied to error signal winding 21 of motor 20 and are thus attempting to rotate the armature shaft to adjust the resonant cavity, they are prevented from doing so because reference field winding 22 is de-energized causing no appropriate phase relationship to exist between said windings which can actuate said armature.

The moment the I.F. drifts out of the null frequency band, the amplitude of the error signal is increased sufficiently to make motor 20 operable by firing tube 25, actuating relays 38 and 40, and energizing reference field winding 22, which inductively cooperates with error signal winding 21 and the armature of said motor at the proper phase to adjust the resonant cavity a correct amount and in the proper direction to retune the intermediate frequency within the null frequency band. As soon as the intermediate frequency enters the null frequency band, the error signal drops enough to cutoff tube 25 and de-energize relay solenoid 38, which, in turn, ultimately de-energizes reference field winding 20 by removing the 120 volt, 400 cycle power source therefrom. Once the intermediate frequency has entered the null band, substantially no electrical disturbance signals can be transmitted to the radar system by the controlling apparatus, inasmuch as motor 20 is inoperative.

The cutoff point of tube 25 may be adjusted manually by regulating potentiometer 34 which applies whatever bias voltage is necessary to produce the desired null frequency band width. Accordingly, as shown in the Error Voltage vs. Frequency curves of FIG. 2, cutoff points A and B may be moved along the curves of phase 1 and phase 2, respectively, by adjusting said bias voltage.

In considering FIG. 2 further, it should be noted that the voltages of phases 1 and 2 decrease to a minimum at points C and D with a flat curve portion therebetween. This flat portion represents the minimum null frequency band width and is determined by design characteristics of the electronic circuit and the amplifier tube associated therewith. By making a suitable choice of bias voltage on said amplifier tube, the null frequency band width may be varied from points C and D to points A and B or elsewhere as desired to provide optimum performance of the radar system under any given set of operating conditions.

It is, therefore, seen that this invention provides a new and useful apparatus which functions as disclosed above to produce improved, substantially distortion-free intermediate frequency effects in a radar system.

Obviously, many modifications and variations of the present invention are possible in the light of the above teachings. It is, therefore, to be understood, that within

What is claimed is:

1. In a radar system, an oscillator means for producing a signal having a substantially stable frequency including a resonant cavity adjustable in frequency by adjustment of its dimensions, a feed-back servo control motor coupled at its shaft to said cavity for adjusting said dimensions, transmitter means for producing a modulated signal frequency, frequency measuring means comprising a mixer and a discriminator connected thereto, said mixer being adapted to mix said transmitter means frequency and said oscillator means frequency to produce an output including an intermediate frequency, said discriminator being adapted to derive from the output of said mixer a deviation signal characteristic of the degree of mistune between said intermediate frequency and a first datum reference frequency, a detector connected to said discriminator adapted to receive and demodulate said deviation signal and produce an output signal whose amplitude is proportional to said degree of mistune, means containing a second datum reference frequency connectable to said servo control motor for energization thereof, a chopper connected to and synchronized with said means containing a second reference frequency, said chopper being connected to receive and chop said detector output signal into an error signal whose phase is leading or lagging said second reference frequency in proportion to the amount said intermediate frequency is above or below said first reference frequency, conductor means connected between said chopper and said servo control motor, whereby said error signal is conveyed to and directionally energizes said motor to effect tuning of said resonant cavity, and means responsive to the amplitude of said error signal to deactivate said motor when said intermediate frequency is within certain range limits above or below said first reference frequency and for activating said motor when said intermediate frequency is outside said limits.

2. The invention as defined in claim 1 wherein said last mentioned means comprises a negatively biased current control tube having an input and an output, said tube input being connected to said conductor to receive said error signal thereby causing said tube to conduct when the amplitude of said error signal is sufficient to overcome said negative bias, and switching means connected to the output of said tube for electrically connecting and disconnecting said second reference frequency power source to and from said servo motor.

3. The invention as defined in claim 2 wherein said switching means comprises cascaded relays.

4. In a radar apparatus, means for producing an intermediate frequency, regulatory means connected to said means for controlling said intermediate frequency with respect to a datum reference frequency value comprising frequency sensing means electrically coupled to said intermediate frequency producing means for providing an error signal proportional to the deviation of said intermediate frequency from said datum reference frequency value, motor means connected to said intermediate frequency producing means, said motor means including an error signal winding and a reference field winding in ninety degree inductive phase relationship, said error signal winding being connected to said frequency sensing means so that said error signal is continuously applied thereto, a power source including a second reference frequency electrically connectable to said reference field winding by a first relay switching means, current control means responsive to said error signal having an input and an output, said current control means normally being biased at a predetermined cutoff voltage until overcome by said error signal, thereby causing same to conduct, adjusting means connected to the input of said current control means for regulating said input bias voltage, and second relay switching means connected to the output of said current control means and cascadedly connected with said first relay switching means, whereby said reference field winding is energized by said power source to actuate said motor means only when said intermediate frequency has deviated a certain amount above or below said datum reference frequency value.

5. The invention as defined in claim 4 wherein said adjusting means connected to the input of said current control means for regulating said input bias voltage is a manually operable variable impedance.

References Cited in the file of this patent

UNITED STATES PATENTS

| | | |
|---|---|---|
| 2,379,689 | Crosby | July 3, 1945 |
| 2,836,721 | Ratcliffe | May 22, 1958 |
| 2,838,673 | Fernsler et al. | June 10, 1958 |